(12) United States Patent
Kim et al.

(10) Patent No.: US 11,650,041 B2
(45) Date of Patent: May 16, 2023

(54) MAGNETIC SENSOR ASSEMBLY FOR SENSING ROTATIONAL POSITIONS OF A CAMERA MODULE

(71) Applicant: HANWHA TECHWIN CO., LTD., Seongnam-si (KR)

(72) Inventors: Chang Yeon Kim, Seongnam-si (KR); Won Joon Kong, Seongnam-si (KR); Jong In Park, Seongnam-si (KR); Kyoung Jae Lee, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 67 days.

(21) Appl. No.: 17/201,498

(22) Filed: Mar. 15, 2021

(65) Prior Publication Data
US 2021/0285754 A1 Sep. 16, 2021

(30) Foreign Application Priority Data
Mar. 16, 2020 (KR) .......................... 10-2020-0032234

(51) Int. Cl.
*G01B 7/30* (2006.01)
*G03B 17/56* (2021.01)
*G01D 5/14* (2006.01)

(52) U.S. Cl.
CPC .............. *G01B 7/30* (2013.01); *G01D 5/145* (2013.01); *G03B 17/561* (2013.01)

(58) Field of Classification Search
CPC ........................... G01D 5/2452; G01D 5/2455
See application file for complete search history.

(56) References Cited

U.S. PATENT DOCUMENTS

| | | | | |
|---|---|---|---|---|
| 2009/0315541 A1* | 12/2009 | Zak | ..................... | G01R 33/0094 324/207.2 |
| 2010/0235054 A1* | 9/2010 | Hoskins | ................. | G01D 5/145 701/42 |
| 2011/0140690 A1* | 6/2011 | Antraygue | ............ | B64C 13/042 324/207.25 |
| 2016/0146630 A1* | 5/2016 | Takahashi | .......... | G01D 5/24438 324/207.25 |
| 2021/0254709 A1* | 8/2021 | Herse | .................... | G01S 7/4972 |

FOREIGN PATENT DOCUMENTS

| | | |
|---|---|---|
| JP | 5840374 B2 | 1/2016 |
| KR | 10-1597639 B1 | 2/2016 |
| KR | 10-1949432 B1 | 2/2019 |

\* cited by examiner

*Primary Examiner* — Noam Reisner

(57) ABSTRACT

A magnetic sensor assembly for detecting angular positions of a camera module, includes: a housing; a rotation member configured to rotate together with the camera module; a magnet member that is configured to rotate with the rotation member on at least a portion of the housing, the magnet member includes a first multi-pole magnetized magnet that has a first number of pole pairs alternately disposed along a first circumference on the rotation member, and further includes a second multi-pole magnetized magnet that has a second number of pole pairs alternately disposed along a second circumference on the rotation member; a hall sensor configured to detect a change of magnetic field generated from the first multi-pole magnetized magnet and the second multi-pole magnetized magnet; and a processor configured to estimate an initial position of the rotation member and a rotational angle from the initial position using the detected magnetic field.

19 Claims, 8 Drawing Sheets

100

100

MAGNETIC SENSOR ASSEMBLY FOR SENSING ROTATIONAL POSITIONS OF A CAMERA MODULE

CROSS-REFERENCE TO THE RELATED APPLICATION

This application claims priority from Korean Patent Application No. 10-2020-0032234 filed on Mar. 16, 2020 in the Korean Intellectual Property Office, the disclosure of which in its entirety is incorporated herein by reference.

FIELD

Embodiments of the present disclosure relate to a sensor assembly for estimating positions of a rotation member, and more specifically, to a sensor assembly for estimating angular positions of the rotation member according to changes of magnetic fields.

DESCRIPTION OF RELATED ART

A pan-tilt-zoom (PTZ) camera among surveillance cameras provides pan/tilt/zoom functions and a preset drive for moving the PTZ camera between predefined coordinate values. To this end, it may be designed such that an error between the designated coordinate values and the coordinate values obtained from captured areas is to be small. Such error is referred to as a preset accuracy and may be managed to normally not exceed 0.2°.

In order to secure an accuracy of the preset drive, a dedicated equipment such as a position detecting sensor may be needed to detect continuously the error between a rotation amount of a motor shaft and a rotation amount of a camera driven by the motor shaft. Such a position detecting sensor includes a hall sensor for detecting a magnetic field of a rotor of the PTZ camera and a photo interrupter sensor (PI sensor) for detecting light interruption by rotation of a rotator of the PTZ camera.

The photo interrupter sensor scheme is used for detecting, by a light receiver, a light interruption pattern which is generated when a plurality of photo interrupters blocks or passes light emitted from a light emitter. On the other hand, the hall sensor scheme is used for detecting, by a magnetic sensor, the magnetic field which changes according to the rotation of a rotation member instead of using such photo interrupters.

The conventional hall sensor scheme has been generally used for simply sensing the initial position. That is, it has been used for estimating the closest position when a single-pole magnet gets close to the hall sensor and estimating the initial position based on the detected position. This hall sensor scheme has advantages of a low production cost and an easy manufacturing process, but also has disadvantages in that a feedback control is difficult because position information is not recognized unless the magnet passes through areas which are sensible by the hall sensor.

In addition, the hall sensor and the magnet should be close to each other and thus it has additional disadvantages in that it needs separate drive modes, costs time for sensing the initial position, and generates errors of the initial position according to approach directions.

Accordingly, there are needs for sensing the initial position of the current direction irrespective of angular positions of the rotation member by improving the conventional hall sensor, and for measuring in real time the initial rotational angle of the rotation member in a uniform resolution.

SUMMARY

According to embodiments of the present disclosure, a magnetic sensor assembly is provided in which angular positions of a surveillance camera can be recognized in real time by a closed-loop control and a current position of the surveillance camera can be precisely recognized even without a predefined initialization process for finding out the reference point of a coordinate system.

According to embodiments of the present disclosure, a magnetic sensor assembly is provided in which preset accuracy of the surveillance camera can be managed under a level of 0.1° and a quick return to the preset position can be guaranteed in case of errors of the angular position.

However, aspects of the present disclosure are not restricted to those set forth herein. Various other aspects of the present disclosure will become more apparent to one of ordinary skill in the art to which the embodiments of the present disclosure pertain by referencing the detailed description of non-limiting example embodiments given below.

According to one or more embodiments, a magnetic sensor assembly for detecting angular positions of a camera module is provided. The magnetic sensor assembly includes: a housing; a rotation member including at least one body and configured to rotate together with the camera module; a magnet member that is configured to rotate with the rotation member on at least a portion of the housing, the magnet member includes a first multi-pole magnetized magnet that has a first number of pole pairs alternately disposed along a first circumference on the rotation member, and further includes a second multi-pole magnetized magnet that has a second number of pole pairs alternately disposed along a second circumference on the rotation member, wherein the first circumference and the second circumference are arranged coaxially; a hall sensor configured to detect a change of a magnetic field generated from the first multi-pole magnetized magnet and the second multi-pole magnetized magnet; and a processor configured to estimate an initial position of the rotation member and a rotational angle from the initial position using the detected magnetic field.

According to an embodiment, the second circumference is arranged inside the first circumference.

According to an embodiment, the first number and the second number are relative primes.

According to an embodiment, the at least one body of the rotation member includes: a pulley configured to rotate based on driving power from a motor; and a bracket on which the camera module is mounted, the bracket configured to rotate together with the pulley such as to transmit rotation power to the camera module, wherein the magnet member is installed on the bracket.

According to an embodiment, at least one slot is formed in the magnet member, each of the at least one slot positioned inside the first multi-pole magnetized magnet and the second multi-pole magnetized magnet and elongated along a third circumference that is smaller than the first circumference and the second circumference, and the at least one body of the rotation member further includes at least one fastener configured to pass through the at least one slot to be fixed on the bracket.

According to an embodiment, the magnet member further includes a marker configured to indicate a reference point of the magnet member, wherein the magnet member is fixed with the bracket by the at least one fastener such that the marker is aligned with another marker on the bracket.

According to an embodiment, the hall sensor is disposed on a circuit board, and the housing includes: a case including a support that is configured to fix the circuit board on which the hall sensor is disposed; a stage coaxially coupled to the bracket and configured to rotate together with the bracket; and at least one bearing installed between the case and the stage and configured to support rotation of the stage.

According to an embodiment, the housing further includes a cover configured to cover the case and the stage from above, and the circuit board is supported by a lower surface of the cover in a first direction and supported by the support of the case in a second direction.

According to an embodiment, the magnetic sensor assembly further includes: a spacer that extends in a radial direction of the magnetic sensor assembly, an internal circumferential surface of the spacer fixed on an external circumferential surface of the stage; and an elastic body interposed under a pre-load between the spacer and the bracket.

According to an embodiment, the elastic body is configured to deform under the pre-load such as to maintain a design gap between the spacer and the bracket even when compressive force is generated between the spacer and the bracket.

According to an embodiment, the magnetic sensor assembly further includes a memory disposed on the circuit board, the memory configured to store a setting value of the hall sensor.

According to an embodiment, the camera module supports pan, tilt, and zoom functions, and the processor is configured to perform a correction operation on an angular position of the rotation member only when the camera module is not panning and tilting.

According to an embodiment, the processor is configured to calculate a moving average of sample values obtained from the hall sensor, and estimate the angular positions of the camera module based on the moving average.

According to one or more embodiments, a magnetic sensor assembly for detecting angular positions of a camera module is provided. The magnetic sensor assembly includes: a case; a rotation member including at least one body and configured to rotate together with the camera module; a multi-pole magnetized magnet alternately disposed along a circumference on the rotation member; a circuit board fixed on the case in a non-rotating state, and including a hall sensor configured to detect a change of a magnetic field generated from the multi-pole magnetized magnet; a stage configured to rotate on the case, the stage coaxially coupled with the rotation member; a spacer that extends in a radial direction of the magnetic sensor assembly, an internal circumferential surface of the spacer fixed on the stage; and an elastic body interposed under a pre-load between the spacer and the rotation member while the spacer and the rotation member are coaxially coupled.

According to an embodiment, the elastic body is configured to deform under the pre-load such as to maintain a design gap between the spacer and the rotation member even when a compressive force is generated between the spacer and the rotation member, thereby maintaining an interval between the hall sensor and the multi-pole magnetized magnet that is arranged on the rotation member.

According to an embodiment, the circuit board further includes a memory configured to store a setting value of the hall sensor, and the memory and the hall sensor are disposed on different surfaces of the circuit board.

According to an embodiment, the magnetic sensor assembly further includes a cover configured to cover the case from above, and the circuit board is supported by the cover in a first direction and supported by the case in a second direction.

According to one or more embodiments, a magnetic sensor assembly for detecting angular positions of a camera module is provided. The magnetic sensor assembly includes: a case; a rotation member including at least one body and configured to rotate together with the camera module; a multi-pole magnetized magnet alternately disposed along a circumference on the rotation member; a circuit board fixed on the case in a non-rotating state, and including a hall sensor configured to detect a change of a magnetic field generated from the multi-pole magnetized magnet; and a cover configured to cover the case from above, wherein the hall sensor is disposed on a lower surface of the circuit board such as to face the multi-pole magnetized magnet with a gap between the hall sensor and a top portion of the multi-pole magnetized magnet, and the circuit board is supported by the cover in a first direction and supported by the case in a second direction.

According to an embodiment, the circuit board further includes: memory configured to store a setting value of the hall sensor; and a connector configured to electrically connect the circuit board and external devices.

According to an embodiment, the connector is disposed on a surface of the circuit board that is different from the lower surface of the circuit board on which the hall sensor is disposed.

DETAILED DESCRIPTION

Figure 1:
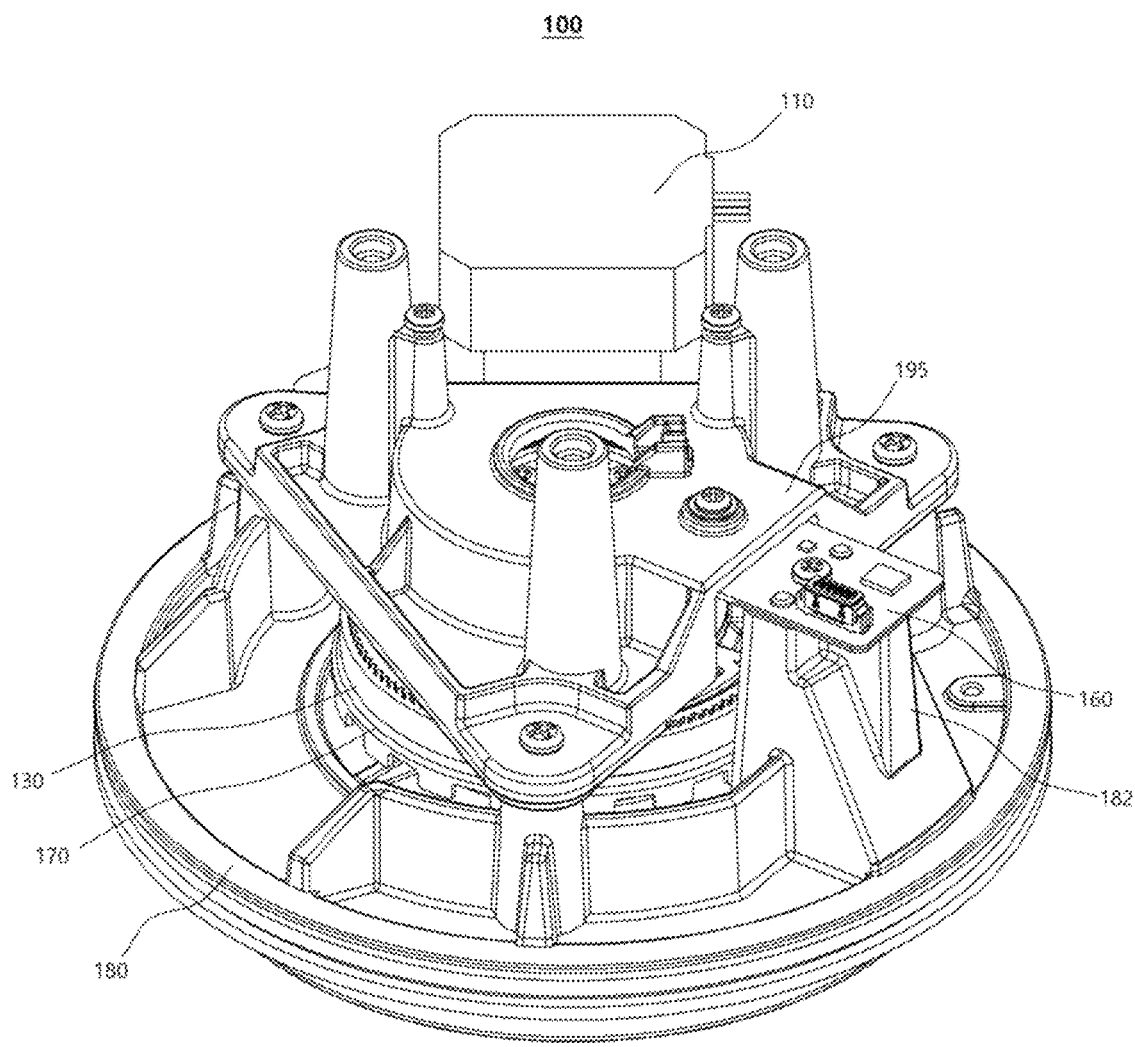
FIG. 1 is an assembled perspective view of a magnetic sensor assembly according to an embodiment for estimating angular positions of a camera module.

Benefits and features of embodiments of the present disclosure, and methods for accomplishing the same will become apparent with reference to non-limiting example embodiments described below in detail in conjunction with the accompanying drawings. However, the embodiments described herein are all example embodiments and, accordingly, the disclosure is not limited to these embodiments described below, but may be implemented in various forms. The example embodiments are merely provided to make the disclosure complete and to fully inform the scope of the disclosure to those ordinarily skilled in the art. Like reference numerals refer to like elements throughout the specification.

Unless otherwise defined, all terms (including technical and scientific terms) used herein may be used in a sense that may be commonly understood by those of ordinary skill in the art. In addition, the terms defined in the commonly used dictionaries should not be ideally or excessively interpreted unless they are specifically defined clearly.

The terms used herein are for the purpose of describing embodiments and are not intended to be limiting of the disclosure. Herein, the singular also includes the plural unless specifically stated otherwise in the phrase. The term "comprises" and/or "comprising" as used herein does not exclude the presence or addition of one or more other components in addition to the mentioned components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the following description, when an element is referred to as being "above" or "on" another element, it may be directly on the other element while making contact with the other element or may be above the other element without making contact with the other element.

Hereinafter, non-limiting examples embodiments of the present disclosure will be described in detail with reference to the accompanying drawings.

Figure 2:
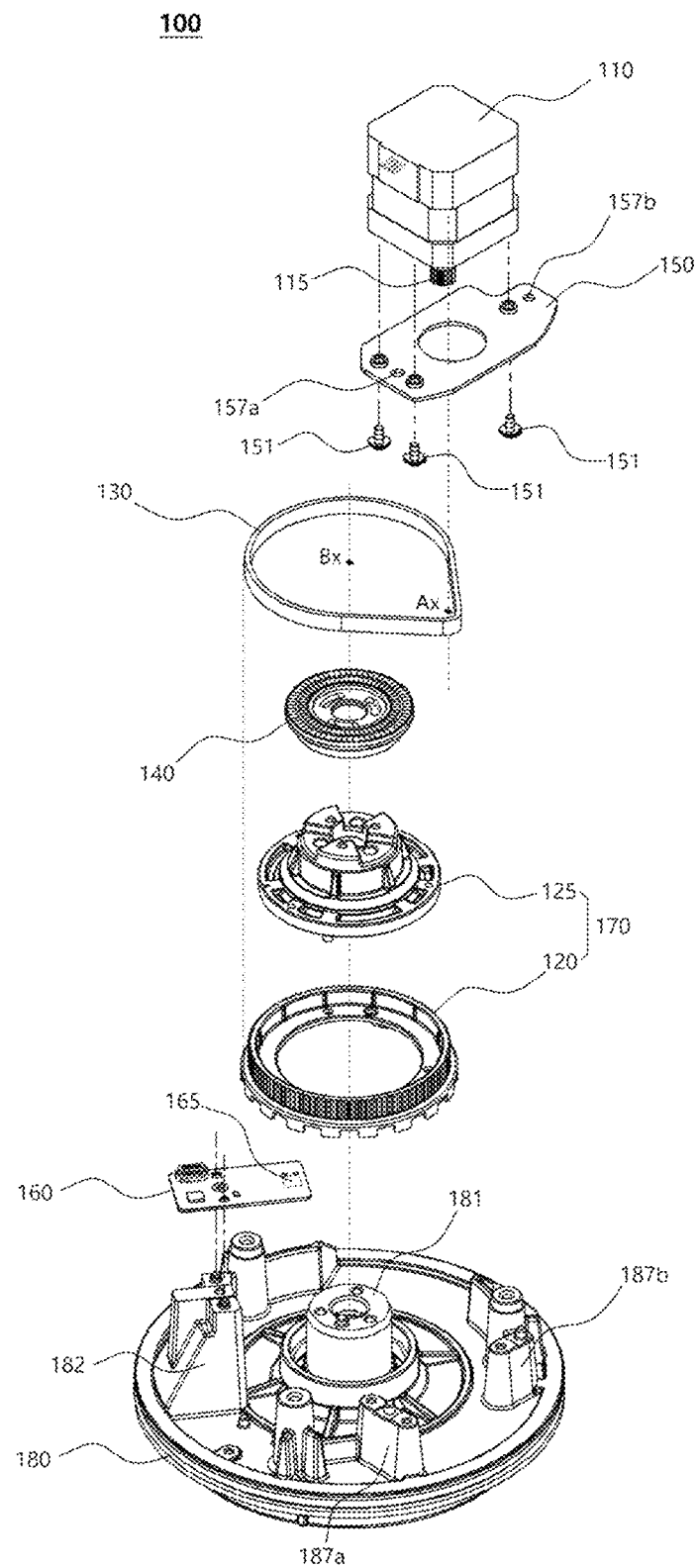
FIG. 2 is an exploded perspective view of the magnetic sensor assembly in which the upper cover is omitted.

FIG. 1 is an assembled perspective view of a magnetic sensor assembly 100 according to an embodiment for estimating angular positions of a camera module, and FIG. 2 is an exploded perspective view of the magnetic sensor assembly 100 in which the upper cover is omitted. The magnetic sensor assembly 100 may include a rotation member 170, a magnet member 140, a hall sensor 165, and a processor. The hall sensor 165 and the processor may be positioned on a circuit board 160. However, alternatively, the processor may be positioned on another circuit board electrically connected to the circuit board 160 having the hall sensor 165.

The rotation member 170 can receive driving power transmitted from a motor 110 and rotate together with the camera module on a second axis Bx. The rotation member 170 is rotatably supported by a stage 181 of a lower case 180.

The motor 110 is coupled to a base 150 by a fastener 151. To this end, the motor shaft 115 extends downward though a hollow of the base 150. After the motor 110 and the base 150 are coupled, the base 150 can be coupled with protrusions installed on supports 187a, 187b of the lower case 180, and thereby fixed on the lower case 180.

According to an embodiment, the housing may comprise or consist of a lower case 180 and an upper cover 195, but it is not limited to this example and the shape and number of the components may be diversified. In addition, a timing belt 130 is shown as a medium for transferring the driving power from the motor 110 to the rotation member 170, but other power transmission members such as a gear mechanism may be also used instead.

A magnet member 140 which is installed on the rotation member 170 includes first and second multi-pole magnetized magnets. According to an embodiment, the rotation member 170 includes a pulley 120 and a bracket 125. The pulley 120 is configured to rotate by the driving power which is transmitted from a motor shaft 115 extended along a first axis Ax from the motor 110. The bracket 125 is configured to rotate together with the pulley 120 and transfer a rotation power to the camera module. Here, the magnet member 140 may be mounted on the bracket 125.

The hall sensor 165 senses changes of a magnetic flux or magnetic field generated by the magnet member 140. A circuit board 160 having the hall sensor 165 is fixedly installed on a support 182 of the lower case 180. Alternatively, the hall sensor 165 can be disposed on the rotation member 170 and the magnet member 140 can be fixedly installed on the support 182, but may not be used in such configuration when considering a twist of wirings or cables.

In addition, the processor estimates an initial position of the rotation member 170 and a rotational angle from the initial position of the rotation member 170, based on changes of the detected magnetic field. The processor can perform an operation to correct the angular position of the rotation member 170 in order to remove errors accumulated over time. If the camera module supports pan/tilt/zoom functions, the operation can be performed only during the pan/tilt operation of the camera module. It is because of resource problems which are caused by measurement and correction during the pan/tilt operation in which the rotation member 170 rotates anyway. On the other hand, even though the camera module is activated, real time correction is possible during an idle period or a period of a zoom operation in which a rotation drive is not needed.

Figure 3:
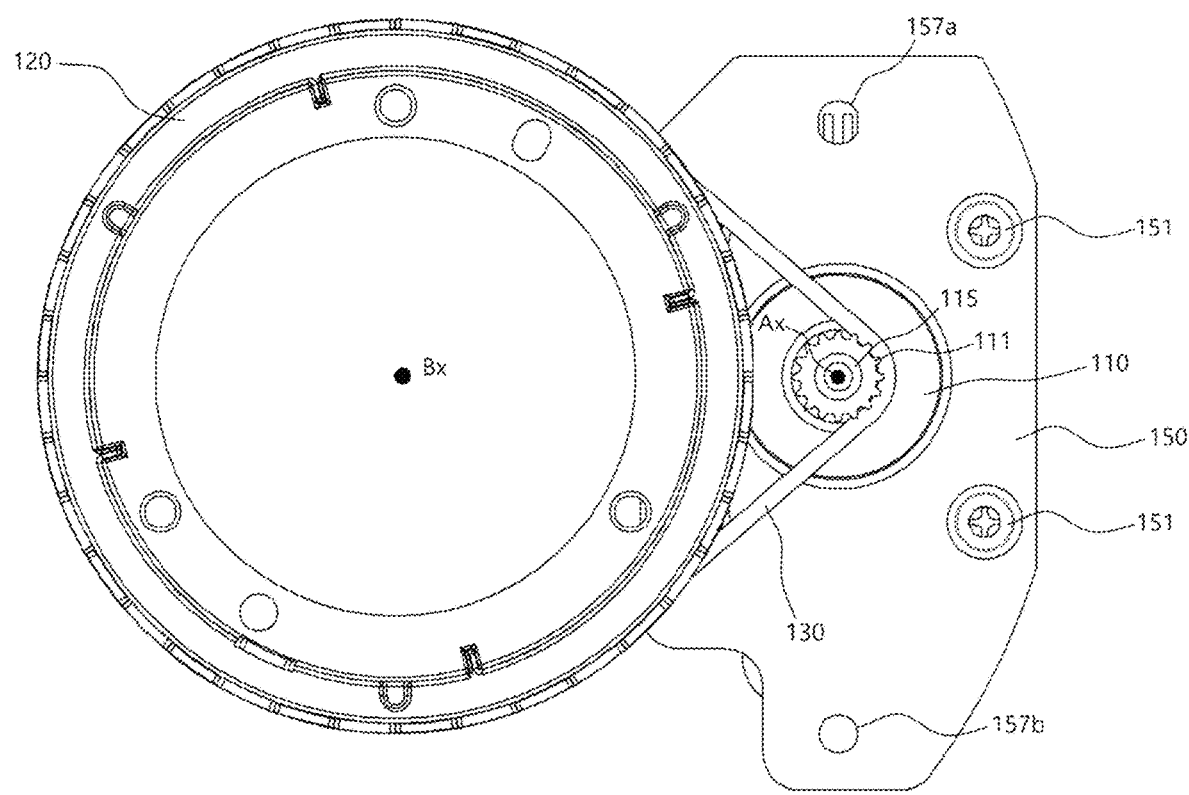
FIG. 3 is a bottom view of the magnetic sensor assembly according to an embodiment without a lower case.

FIG. 3 is a bottom view of a magnetic sensor assembly 100 according to an embodiment without a lower case 180.

The driving power generated from the motor 110 is transmitted to the motor shaft 115 which extends along a first axis Ax from the motor 110. The driving power is also transmitted via a timing belt 130 to the pulley 120 which is spaced from the first axis Ax and rotates around a second axis Bx. Specifically, the timing belt 130 couples together the motor shaft 115 and the pulley 120 and converts the rotation from the motor shaft 115 to the rotation of the pulley 120. Accordingly, a portion of the timing belt 130 close to the first axis Ax engages with an end 111 of the motor shaft 115, and another portion of the timing belt 130 surrounding the second axis Bx engages with the outer circumferential surface of the pulley 120.

Figure 4:
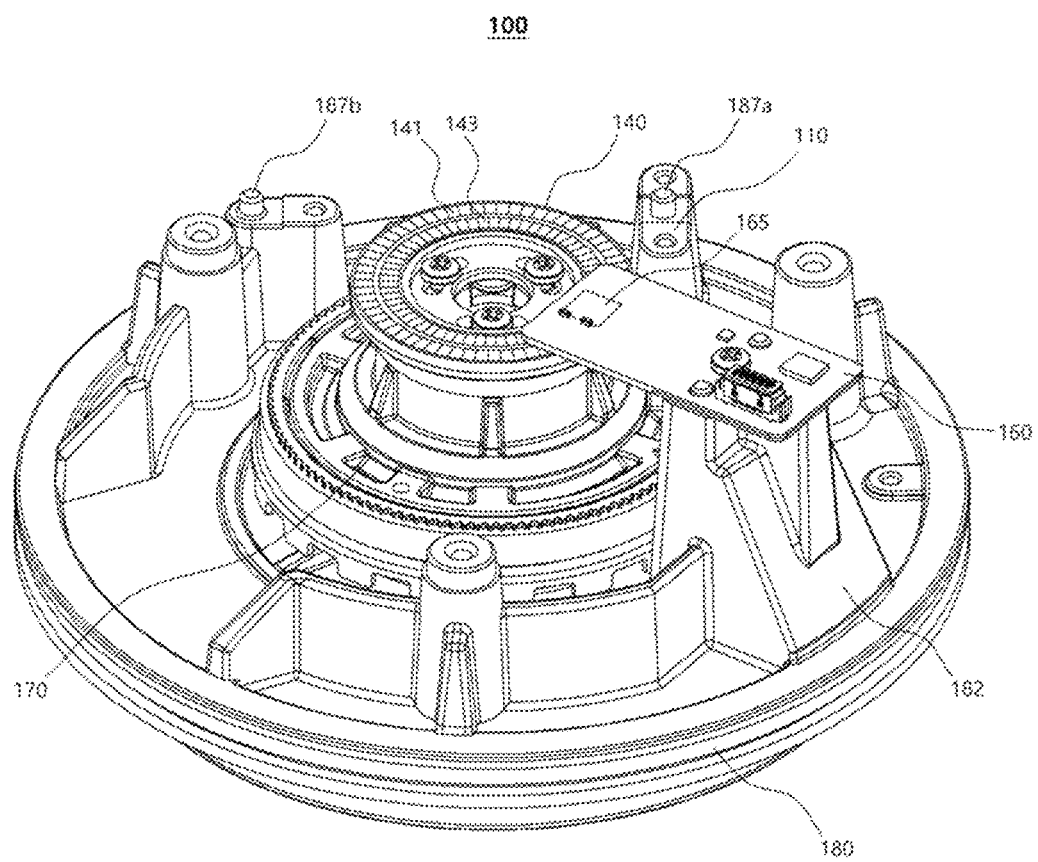
FIG. 4 is a perspective view of the magnetic sensor assembly in which an outer cover and elements for power generation/transmission are omitted.
Figure 5:
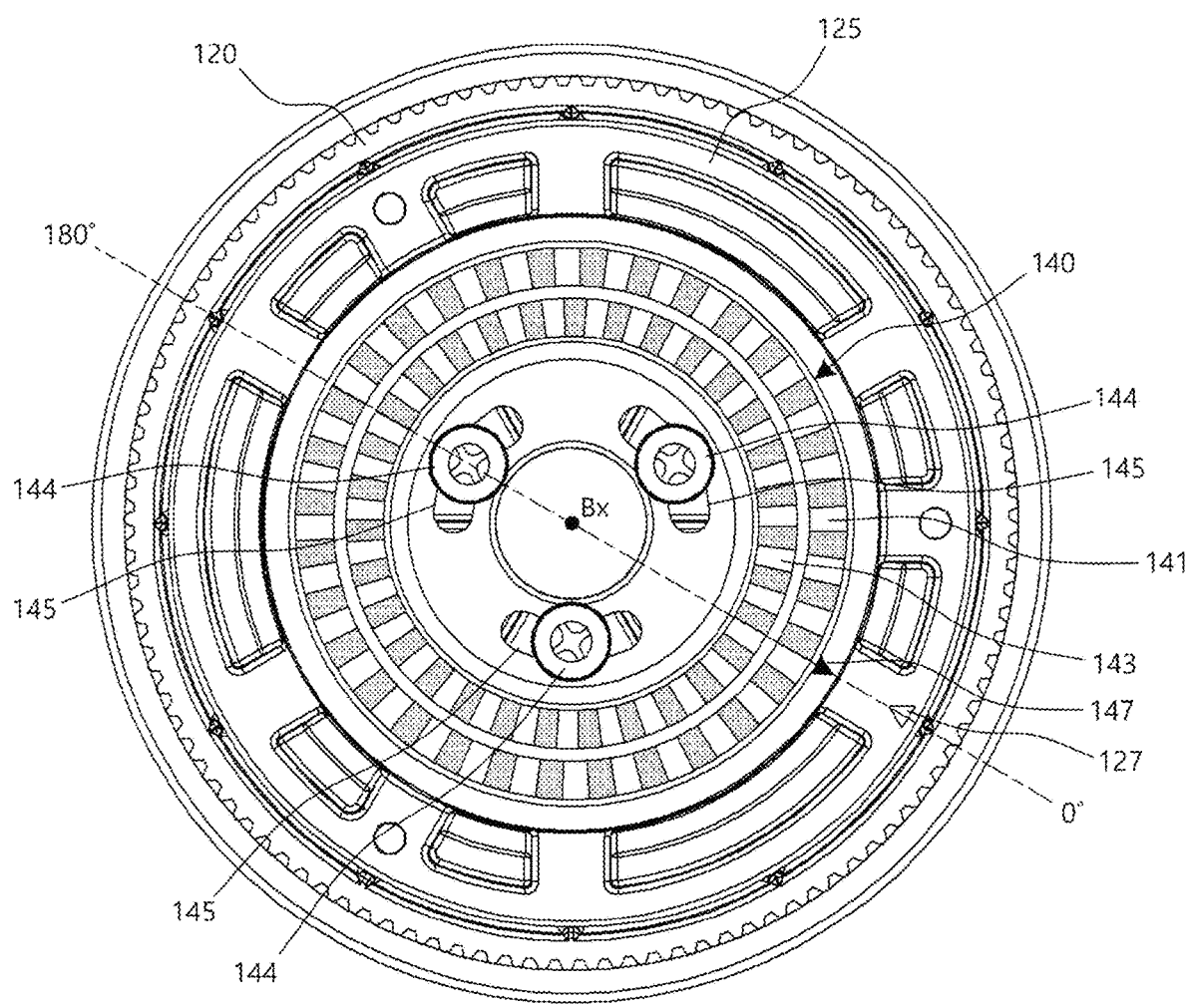
FIG. 5 is a top view showing a magnet member and a rotation member having a bracket and a pulley.

FIG. 4 is a perspective view of the magnetic sensor assembly in which the outer cover 195 and elements for power generation/transmission are omitted, and FIG. 5 is a top view showing the magnet member 140, and the bracket 125 and the pulley 120 of the rotation member 170.

As described above, the pulley 120, the bracket 125, and the magnet member 140 are configured to be fixed to each other and rotate together according to the rotation of the pulley 120. Here, the magnet member 140 includes a first multi-pole magnetized magnet 141 and a second multi-pole magnetized magnet 143. As such, changes of the magnetic field from magnets of the magnet member 140, that rotates, can be detected by the hall sensor 165 which is fixedly disposed close to the magnet member 140. As shown in FIG. 4, the hall sensor 165 is illustrated in a dotted line since it is installed on a lower surface of the circuit board 160 such that the hall sensor 165 and the magnet member 140 can face each other.

Referring to FIG. 5, the first multi-pole magnetized magnet 141 is alternatively disposed along a first circumference on the rotation member 170 and has a first number of pole pairs. In addition, a second multi-pole magnetized magnet 143 is alternatively disposed along a second circumference on the rotation member 170 which is arranged coaxially with the first circumference, and has a second number of pole pairs. Here, the pole pair means a pair having a predefined pitch and comprising or consisting of an N pole and a S pole which are adjacent to each other. In FIG. 5, the N pole is illustrated in a shaded cell and the S pole is illustrated in a white cell, within the first multi-pole magnetized magnet 141 and the second multi-pole magnetized magnet 143.

To this end, since the second circumference is positioned close to and inside the first circumference, the hall sensor 165 can detect together the magnet fields from the first multi-pole magnetized magnet 141 and the second multi-pole magnetized magnet 143.

The processor is configured to estimate the initial position of the rotation member and the rotational angle from the initial position, based on changes of the magnetic field detected by the hall sensor 165. As such, it is possible to recognize the current absolute position as soon as power from a power source is supplied to the hall sensor 165, by using the first multi-pole magnetized magnet 141 and the second multi-pole magnetized magnet 143 disposed radially close to each other.

The processor has functions to load various processing instructions and threads on a volatile memory device such as a random-access memory (RAM) or a non-volatile memory device such as a read-only memory (ROM), and process those instructions and threads. Generally, the processor may be implemented by a central processing unit (CPU), a micro-processor, a field-programmable gate array (FPGA), or an application-specific integrated circuit (ASIC). The processing instructions stored on the memory may be configured to, when executed by the processor, cause the processor to performs its functions. The memory may be the same or different memory from a memory device 163 described below.

In FIG. 5, once the magnet sensor assembly 100 is assembled, the initial position does not change until a later reassemble and thus the hall sensor 165 can recognize the current angular position based on the information from the two magnet rings without an additional initialization scenario. This feature contributes to reducing a booting time and removing a surveillance blackout because it does not require the initialization process generally performed by the conventional PTZ cameras.

In addition, according to the conventional arts, there is a need to regularly resume the initialization process for resetting the coordinate after a predefined amount of errors are accumulated. In contrast, according to embodiments of the disclosure, it is possible to correct the angular position without the initialization process and recognize the absolute coordinate value in real time.

In this regard, embodiments of the present disclosure include a first multi-pole magnetized magnet 141 and a second multi-pole magnetized magnet 143, such that the first number of pole pairs of the first multi-pole magnetized magnet 141 is a different number from the second number of pole pairs of the second multi-pole magnetized magnet 143.

Specifically, the first number and the second number have a relation of relative primes. Here, the positions of the pole pairs from the first multi-pole magnetized magnet 141 and the positions of the pole pairs from the second multi-pole magnetized magnet 143 are offset differently at all the positions, and thus it is possible to sense immediately or at least quickly the current position of the rotation member 170 without the initialization scenario.

Even though the first number and the second number are relative primes, too small second number relative to the first number may degrade a sensing resolution. To avoid degradation of sensing resolution, the second number may be maximized as long as it is smaller than the first number. For example, the second number may be smaller than the first number by one, which maintains the relative prime relation between the first and second numbers while maximizing the second number.

According to an embodiment as shown in FIG. 5, the first number is 32 and the second number is 31. In this case, the offset between the first multi-pole magnetized magnet 141 and the second multi-pole magnetized magnet 143 is zero at the starting point (0° position in FIG. 5), increases along the circumferential direction, and is maximized at the opposite point (180° position in FIG. 5). The starting point means a position where the reference points of the first multi-pole magnetized magnet 141 and the second multi-pole magnetized magnet 143 are the same. After the opposite point, the offset decreases to the starting point and the offset becomes zero again at the starting point. According to the embodiment as shown in FIG. 5, the detectable resolution is about 0.01°, and at least 0.1° even in a circumstance where a sensing error and a deviation should be considered.

On the other hand, an alignment of the initial assemble position in which the magnet member 140 is mounted on the bracket 125 may affect accuracies in sensing rotational angles. Accordingly, the magnetic sensor assembly 100 may be aligned during the assembling process. According to an embodiment, the magnet member 140 may further include at least one slot 145 and at least one fastener 144 for the alignment during the assembling process.

The at least one slot 145 is positioned inside the first multi-pole magnetized magnet 141 and the second multi-pole magnetized magnet 143 such that the magnet member 140 is installed on the bracket 125, and arranged such as to be elongated along a third circumference which is smaller than the first and second circumferences.

In addition, each of the at least one fastener 144 passes through a corresponding one of the at least one slot 145 and is fixed on the bracket 125.

Accordingly, after provisionally assembling each of the at least one fastener 144 in each of the at least one slot 145 of the magnet member 140 on the bracket 125, a user can correctly adjust the circumferential direction of the magnet member 140 by moving the magnet member 140 a little in the circumferential direction and complete the alignment by finally fixing the at least one fastener 144.

In order to facilitate such an alignment, the magnet member 140 may further include a marker 147 indicating a reference point of the magnet member 140. The user can finally fix the at least one fastener 144 when the marker 147 coincides with another marker 127 of the bracket 125.

Figure 6:
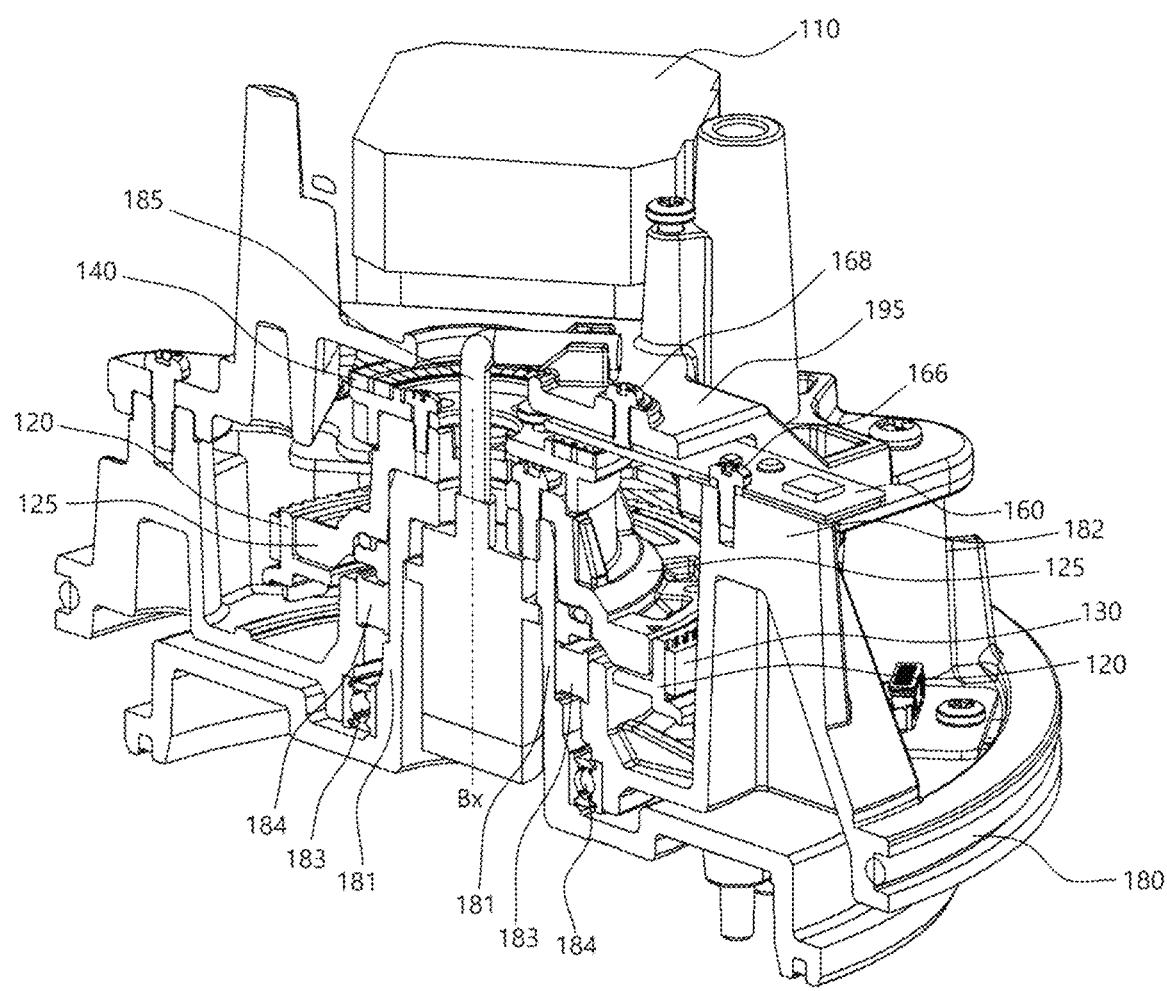
FIG. 6 is a sectional perspective view taken along a radial direction of the magnetic sensor assembly.
Figure 7:
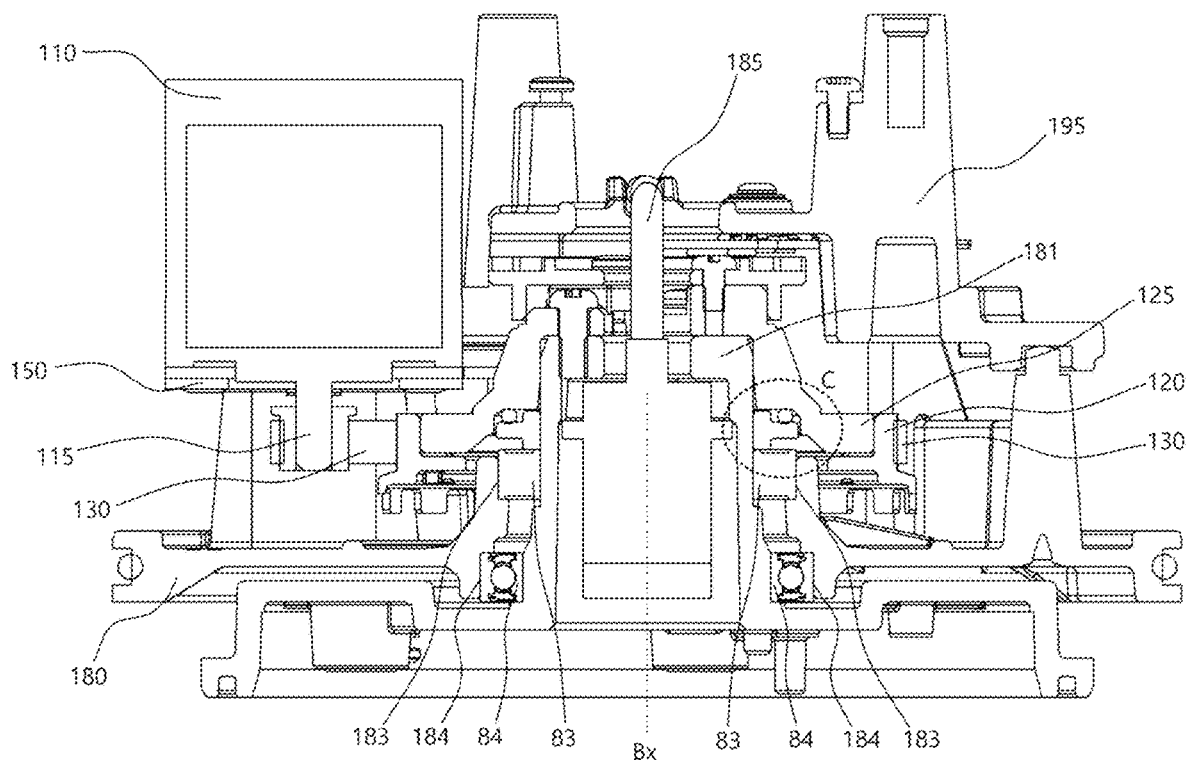
FIG. 7 is a sectional front view of the magnetic sensor assembly taken along the radial direction of the magnetic sensor assembly.
Figure 8:
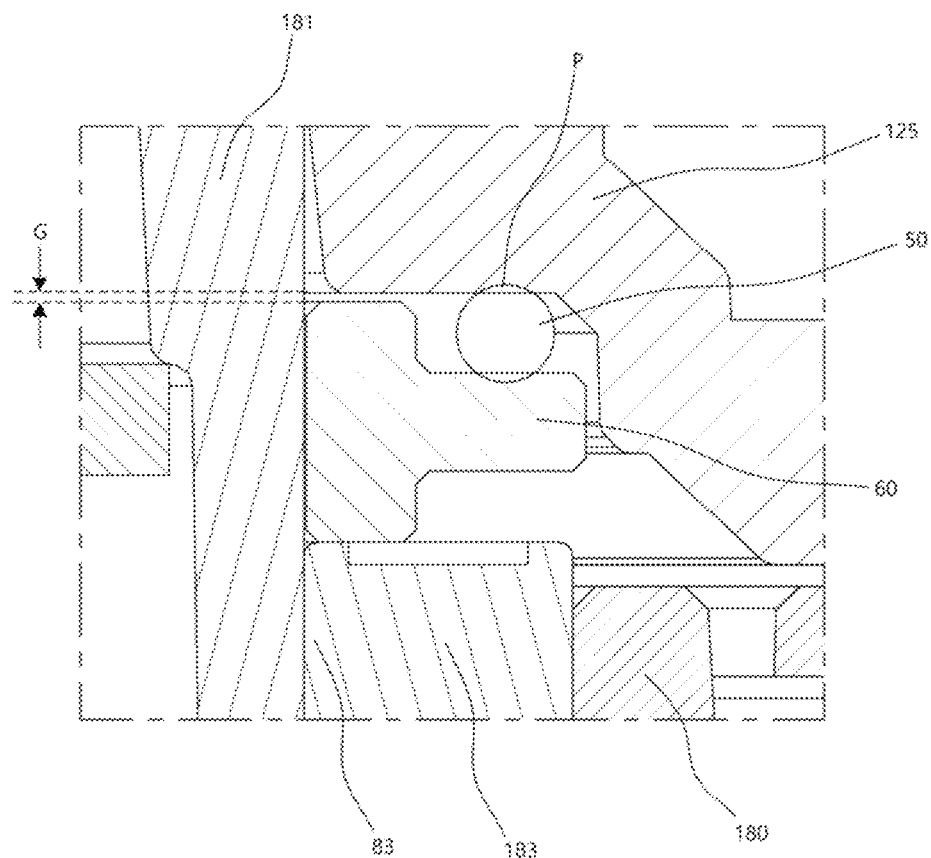
FIG. 8 is a top view in which the area C of FIG. 7 is magnified.

FIG. 6 is a sectional perspective view taken along the radial direction of the magnetic sensor assembly 100, FIG. 7 is a sectional front view taken along the radial direction of the magnetic sensor assembly 100, and FIG. 8 is a top view in which the area C of FIG. 7 is magnified.

Referring to FIG. 6, the circuit board 160 is bidirectionally fixed or supported by fasteners 168, 166 at both the lower surface of the upper cover 195 and the support 182 of the lower case 180. This feature protects the hall sensor 165 by covering the upper surface of the circuit board 160, and adjusts a gap between the magnet member 140 and the hall sensor 165 by the fastener 168 passing through the upper cover 195.

During assembling of the hall sensor 165 and the magnet member 140, the dominant factor to affect the subsequent magnetic sensing is a distance between the magnet member 140 and the hall sensor 165. This is because the sensing sensitivity sharply decreases due to diminution of the magnetic field as the distance between the magnet member 140 and the hall sensor 165 increases. Generally, the distance between a magnet and a hall sensor is designed to be within a range of 0.3 mm to 0.6 mm and the distance may be designed to be about 1 mm in a special circumstance where strength of the magnet field is considerably high or an accurate sensing is not required.

According to embodiments, the distance between the magnet member 140 and hall sensor 165 may be about 0.5 mm, but it may have a range of 0.35 mm to 0.65 mm due to data distribution caused by clearance ranges of components. However, errors arising from the assembling process can still cause the distance to be larger than 0.7 mm beyond the data distribution. To this end, it is possible to forcibly reduce the distance by introducing, to the upper cover 195, a fastener 168 such as a screw and adjusting the fixing amount of the fastener 168.

On the other hand, according to embodiments, the support 182 of the housing is defined at the lower case 180 in order to fix the circuit board 160 on which the hall sensor 165 installed. Additionally, the housing may further include a stage 181, a first bearing 183, and a second bearing 184. The stage 181 is coaxially coupled to the rotation member 170, more specifically, the bracket 125 and rotates together with the bracket 125.

In addition, the first bearing 183 and the second bearing 184 support the rotation of the stage 181 between the lower case 180 and the stage 181. The first bearing 183 may be a thrust bearing to support the force in the longitudinal direction, and the second bearing 184 may be a ball bearing to support the force in the radial direction.

As such, a plurality of bearings are disposed in order to minimize shaking of an output shaft 185. In addition, a stopper (not shown) may be further disposed at inner wheels 83, 84 of the first bearing 183 and the second bearing 184 in order to determine the position of the rotation axis Bx and prevent breakage of the first bearing 183 and the second bearing 184.

To this end, in a case that a stopper excessively depresses the inner wheels 83, 84 of the first bearing 183 and the second bearing 184, the bearings may be damaged or their performance may be degraded due to an increase of drive friction. Accordingly, a design gap G may be provided such as to avoid the stopper excessively depressing the inner wheels 83, 84 irrespective of accumulated clearances of the components. However, such a design gap G increases data distribution of the distance between the magnet member 140 and the hall sensor 165, and thus it may be designed such that data distribution of the distance is more uniform.

According to an embodiment, an elastic body such as rubber, resin, or other resilient material may be provided to solve the above problem. That is, the elastic body may be disposed in the design gap G in order to compensate the data distribution by its resilience. Accordingly, it is possible to minimize the motor shaft 115 shaking while minimizing data distribution of the distance between the magnet member 140 and the hall sensor 165 even when the camera module is installed in extreme circumstances.

Specifically, according to an embodiment, the magnetic sensor assembly 100 may further include a spacer 60 and an elastic body 50. The spacer 60 is radially extended and its inner circumferential surface is fixed at the outer circumferential surface of the stage 181. To this end, the bottom of the spacer 60 contacts the inner wheel 83 of one bearing among a plurality of bearings (e.g. the first bearing 183 and the second bearing 184).

In addition, elastic body 50 is interposed under a pre-load P (bias force) between the spacer 60 and the bracket 125. The elastic body 50 is implemented, for example, by resilient material such as rubber and resin having a ring shape or a sphere shape. The design gap G can be maintained between the bracket 125 and the spacer 60 because the elastic body 50 is deformed under the pre-load P, even though a compressive force is generated between the spacer 60 and the bracket 125. Maintaining the design gap G also assists in maintaining the sensing distance between the magnet member 140 and the hall sensor 165.

Figure 9:
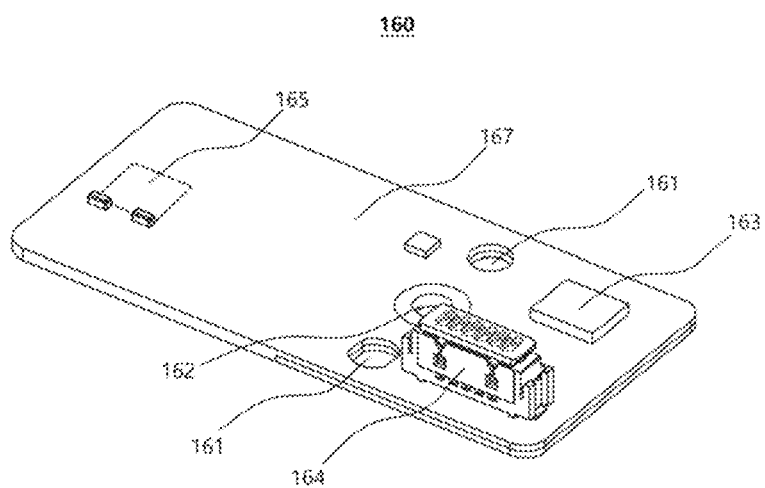
FIG. 9 is a perspective view showing a circuit board according to an embodiment.

FIG. 9 is a perspective view showing a circuit board 160 according to an embodiment. The hall sensor 165 is disposed on a plate 167 of the circuit board 160 in order to basically detect the magnetic flux of the magnet member 140. Specifically, the hall sensor 165 may be disposed on the lower surface of the circuit board 160 with a gap from a top portion of multi-pole magnetized magnets 141, 143.

In addition, a connector socket 164 and through holes 161, 162 are also disposed on the plate 167. The through holes 161, 162 is used to couple the circuit board 160 to the support 182 of the lower case 180, and a connector socket 164 is used to enable a communication or a power transmission with an external device such as an external circuit board and a power supply.

In addition, a memory device 163 is disposed on the plate 167 and stores setting values of the hall sensor 165. The memory device 163 may be implemented by various non-volatile memory device such as EPROM, EEPROM, and flash ROM. The setting values stored in the memory device 163 may contribute to securing stability during data communication. For example, since the setting values are stored on the circuit board 160, information of the hall sensor 165 can be maintained even when another circuit board or electric components other than the circuit board 160 are under repair. Accordingly, the hall sensor 165 still works well without a need of additional setting even after repairing other components.

According to embodiments, the hall sensor 165, the memory device 163, and the connector socket 164 may be disposed on either side of the circuit board 160. According to an embodiment, the hall sensor 165 may be disposed on the lower surface of the circuit board 160 such that the hall sensor 165 faces the first multi-pole magnetized magnet 141 and the second multi-pole magnetized magnet 143, which contributes to effectively detecting the magnetic flux of the first multi-pole magnetized magnet 141 and the second multi-pole magnetized magnet 143.

On the other hand, the memory device 163 and connector socket 164 may be on the other surface, that is, on the top surface in order to prevent interference with other elements such as the first multi-pole magnetized magnet 141 and the second multi-pole magnetized magnet 143. Lastly, the processor can estimate the initial position of the rotation member 170 and the rotational angle from the initial position, based on changes of the detected magnetic flux.

Meanwhile, noise generation from the hall sensor 165 may occur because its signal is inherently affected by vibrations of the magnetic sensor assembly 100, vibrations from the outside, and magnetic field interferences. Accordingly, the processor of embodiments of the present disclosure may be configured to find out filtered values corresponding to the current position from the signal including noise components. According to an embodiment, the processor may collect N numbers of sample values periodically and calculate continuously an average from N numbers of sample values, that is, a moving average.

According to an embodiment, the processor may collect the sample values for about one second, between after completion of the pan/tilt operation and before completion of a focus movement for zooming. As a result, an additional processing can be performed for correcting the error values right after the completion of the pan/tilt operation, and thus sensing accuracy of the camera module will be enhanced.

According to an embodiment, it is possible to recognize the current position without an additional initialization process, recognize the angular position of the surveillance camera in real time, and quickly correct errors generated from the angular position.

In addition, it is possible to maintain intervals between a hall sensor and magnets mounted on the rotation member in a predefined range.

The disclosure has been described herein with regard to non-limiting examples embodiments. However, it will be understood to those skilled in the art that various modifications may be made without departing from the gist of the disclosure. Therefore, it is to be understood that the scope of the disclosure is not limited to the above-mentioned embodiments and is intended to include various modifications and equivalents included within the spirit and scope of the present disclosure.

What is claimed is:

1. A magnetic sensor assembly for detecting angular positions of a camera module, the magnetic sensor assembly comprising:
   a housing;
   a rotation member comprising at least one body and configured to rotate together with the camera module;
   a magnet member that is configured to rotate with the rotation member on at least a portion of the housing, the magnet member comprises a first multi-pole magnetized magnet that has a first number of pole pairs alternately disposed along a first circumference on the rotation member, and further comprises a second multi-pole magnetized magnet that has a second number of pole pairs alternately disposed along a second circumference on the rotation member, wherein the first circumference and the second circumference are arranged coaxially;
   a hall sensor configured to detect a change of a magnetic field generated from the first multi-pole magnetized magnet and the second multi-pole magnetized magnet; and
   a processor configured to estimate an initial position of the rotation member and a rotational angle from the initial position using the detected magnetic field,
   wherein the at least one body of the rotation member comprises:
      a pulley configured to rotate based on driving power from a motor; and
      a bracket on which the camera module is mounted, the bracket configured to rotate together with the pulley such as to transmit rotation power to the camera module, and
   wherein the magnet member is installed on the bracket such that the magnet member is concentric with respect to the bracket and configured to be non-concentric with respect to a motor shaft of the motor.

2. The magnetic sensor assembly of claim 1, wherein the second circumference is arranged inside the first circumference.

3. The magnetic sensor assembly of claim 1, wherein the first number and the second number are relative primes.

4. The magnetic sensor assembly of claim 1, wherein
   at least one slot is formed in the magnet member, each of the at least one slot positioned inside the first multi-pole magnetized magnet and the second multi-pole magnetized magnet and elongated along a third circumference that is smaller than the first circumference and the second circumference, and
   the at least one body of the rotation member further comprises at least one fastener configured to pass through the at least one slot to be fixed on the bracket.

5. The magnetic sensor assembly of claim 4, wherein the magnet member further comprises a marker configured to indicate a reference point of the magnet member, and
   the magnet member is fixed with the bracket by the at least one fastener such that the marker is aligned with another marker on the bracket.

6. The magnetic sensor assembly of claim 1, wherein
   the hall sensor is disposed on a circuit board, and
   the housing comprises:
      a case comprising a support that is configured to fix the circuit board on which the hall sensor is disposed;
      a stage coaxially coupled to the bracket and configured to rotate together with the bracket; and
      at least one bearing installed between the case and the stage and configured to support rotation of the stage.

7. The magnetic sensor assembly of claim 6, wherein the housing further comprises a cover configured to cover the case and the stage from above, and
   the circuit board is supported by a lower surface of the cover in a first direction and supported by the support of the case in a second direction.

8. The magnetic sensor assembly of claim 6, further comprising:
   a spacer that extends in a radial direction of the magnetic sensor assembly, an internal circumferential surface of the spacer fixed on an external circumferential surface of the stage; and
   an elastic body interposed under a pre-load between the spacer and the bracket.

9. The magnetic sensor assembly of claim 8, wherein the elastic body is configured to deform under the pre-load such as to maintain a design gap between the spacer and the bracket even when compressive force is generated between the spacer and the bracket.

10. The magnetic sensor assembly of claim 6, further comprising a memory disposed on the circuit board, the memory configured to store a setting value of the hall sensor.

11. The magnetic sensor assembly of claim 1, wherein the processor is configured to calculate a moving average of sample values obtained from the hall sensor, and estimate the angular positions of the camera module based on the moving average.

12. A magnetic sensor assembly for detecting angular positions of a camera module, the magnetic sensor assembly comprising:
   a housing;
   a rotation member comprising at least one body and configured to rotate together with the camera module;
   a magnet member that is configured to rotate with the rotation member on at least a portion of the housing, the magnet member comprises a first multi-pole magnetized magnet that has a first number of pole pairs alternately disposed along a first circumference on the rotation member, and further comprises a second multi-pole magnetized magnet that has a second number of pole pairs alternately disposed along a second circumference on the rotation member, wherein the first circumference and the second circumference are arranged coaxially;

a hall sensor configured to detect a change of a magnetic field generated from the first, multi-pole magnetized magnet and the second multi-pole magnetized magnet; and a processor configured to estimate an initial position of the rotation member and a rotational angle from the initial position using the detected magnetic field, wherein the camera module supports pan, tilt, and zoom functions, and the processor is configured to perform a correction operation on an angular position of the rotation member only when the camera module is not panning and tilting.

13. A magnetic sensor assembly for detecting angular positions of a camera module, the magnetic sensor assembly comprising:

a case;

a rotation member comprising at least one body and configured to rotate together with the camera module;

a multi-pole magnetized magnet alternately disposed along a circumference on the rotation member;

a circuit board fixed on the case in a non-rotating state, and comprising a hall sensor configured to detect a change of a magnetic field generated from the multi-pole magnetized magnet;

a stage configured to rotate on the case, the stage coaxially coupled with the rotation member;

a spacer that extends in a radial direction of the magnetic sensor assembly, an internal circumferential surface of the spacer fixed on the stage; and an elastic body interposed under a pre-load between the spacer and the rotation member while the spacer and the rotation member are coaxially coupled.

14. The magnetic sensor assembly of claim 13, wherein the elastic body is configured to deform under the pre-load such as to maintain a design gap between the spacer and the rotation member even when a compressive force is generated between the spacer and the rotation member, thereby maintaining an interval between the hall sensor and the multi-pole magnetized magnet that is arranged on the rotation member.

15. The magnetic sensor assembly of claim 13, wherein the circuit board further comprises a memory configured to store a setting value of the hall sensor, and the memory and the hall sensor are disposed on different surfaces of the circuit board.

16. The magnetic sensor assembly of claim 13, further comprising a cover configured to cover the case from above, and the circuit board is supported by the cover in a first direction and supported by the case in a second direction.

17. A magnetic sensor assembly for detecting angular positions of a camera module, the magnetic sensor assembly comprising:

a case;

a rotation member comprising at least one body and configured to rotate together with the camera module;

a multi-pole magnetized magnet alternately disposed along a circumference on the rotation member;

a circuit board fixed on the case in a non-rotating state, and comprising a hall sensor configured to detect a change of a magnetic field generated from the multi-pole magnetized magnet; and a cover configured to cover the case from above, wherein the hall sensor is disposed on a lower surface of the circuit board such as to face the multi-pole magnetized magnet with a gap between the hall sensor and a top portion of the multi-pole magnetized magnet, and the circuit board is supported by the cover in a first direction and supported by the case in a second direction, wherein the at least one body of the rotation member comprises:

a pulley configured to rotate based on driving power from a motor; and a bracket on which the camera module is mounted, the bracket configured to rotate together with the pulley such as to transmit rotation power to the camera module, and wherein the multi-pole magnetized magnet is installed on the bracket such that the multi-pole magnetized magnet is concentric with respect to the bracket and configured to be non-concentric with respect to a motor shaft of the motor.

18. The magnetic sensor assembly of claim 17, wherein the circuit board further comprises:

memory configured to store a setting value of the hall sensor; and a connector configured to electrically connect the circuit board and external devices.

19. The magnetic sensor assembly of claim 18, wherein the connector is disposed on a surface of the circuit board that is different from the lower surface of the circuit board on which the hall sensor is disposed.

* * * * *